US008266640B2

(12) United States Patent
Kang et al.

(10) Patent No.: US 8,266,640 B2
(45) Date of Patent: Sep. 11, 2012

(54) DISK GUIDING DEVICE

(75) Inventors: Ho-Cheng Kang, ShinJuang (TW);
Sung-Hsuan Wang, ShinJuang (TW)

(73) Assignee: Bluhen Tech Enterprise Ltd. (TW)

( * ) Notice: Subject to any disclaimer, the term of this patent is extended or adjusted under 35 U.S.C. 154(b) by 332 days.

(21) Appl. No.: 12/820,138

(22) Filed: Jun. 21, 2010

(65) Prior Publication Data

US 2010/0325645 A1 Dec. 23, 2010

(30) Foreign Application Priority Data

Jun. 23, 2009 (TW) .............................. 98121078 A (51) Int. Cl.
*G11B 17/03* (2006.01)
(52) U.S. Cl. ....................................................... 720/601
(58) Field of Classification Search .................. 720/601, 720/652, 648, 603, 649, 617, 655, 695, 624, 720/657, 620, 626, 653, 646, 634, 651, 615, 720/632, 619, 616, 606, 608
See application file for complete search history.

(56) References Cited

U.S. PATENT DOCUMENTS

2007/0124746 A1* 5/2007 Shizuya et al. ............... 720/649
2009/0119692 A1* 5/2009 Fujimori et al. .............. 720/652

* cited by examiner

*Primary Examiner* — Allen Cao (57) ABSTRACT

The present invention is related to a disk guiding device disposed on a disk process device, the disk guiding device comprises a base, a transmitting portion and a slaver. The base is disposed on a main body of the disk process device; the transmitting portion comprises a gear and a positioning module, wherein the gear is pivotally connected to the base and has a long gear and a plurality of short gears, the positioning module is disposed on the base for sustaining and taking the crown of the long gear for confining the rotation angle of the gear. The slaver is disposed and capable of sliding on a plane portion of the base, wherein a plurality of holes are disposed on the salver in sequence from an end-side of the salver toward the perpendicular direction of the end-side, and used for correspondingly engaging with the gear.

13 Claims, 9 Drawing Sheets

DISK GUIDING DEVICE

CROSS-REFERENCE TO RELATED APPLICATION

This application claims foreign priority from a Taiwan Patent Application, Ser. No. 098121078, filed on Jun. 23, 2009.

BACKGROUND OF THE INVENTION

1. Technical Field

The present invention relates to a guiding device, and more particularly, to a disk guiding device which can be applied in a disk process device for controlling to input and withdraw a disk.

2. Description of Related Art

Disk is a one of the major storing media currently, which is used to store the digital video contents, backup data, program software, etc., for a long time. Disk is able to satisfy the demand of saving high capacity data and better than the hard disc and the flash memory in aspects of the data preserving years and the cost. So that, disk still plays an important part when various new technologies and the web storage are developed.

Read-only disk is mass produced by compressing process, that is, to automatically print the disk cover after completing the lithography and the injection molding of the disk. Such disk production mode must finished by using different tools and equipments and is merely adapted to produce thousands of disks belonging to large-scale of mass production; however, the small-scale of mass production that can produce tens to hundreds of disks utilizing the CD burner to write the data into the disks and the printer to process the disk cover.

Figure 1:
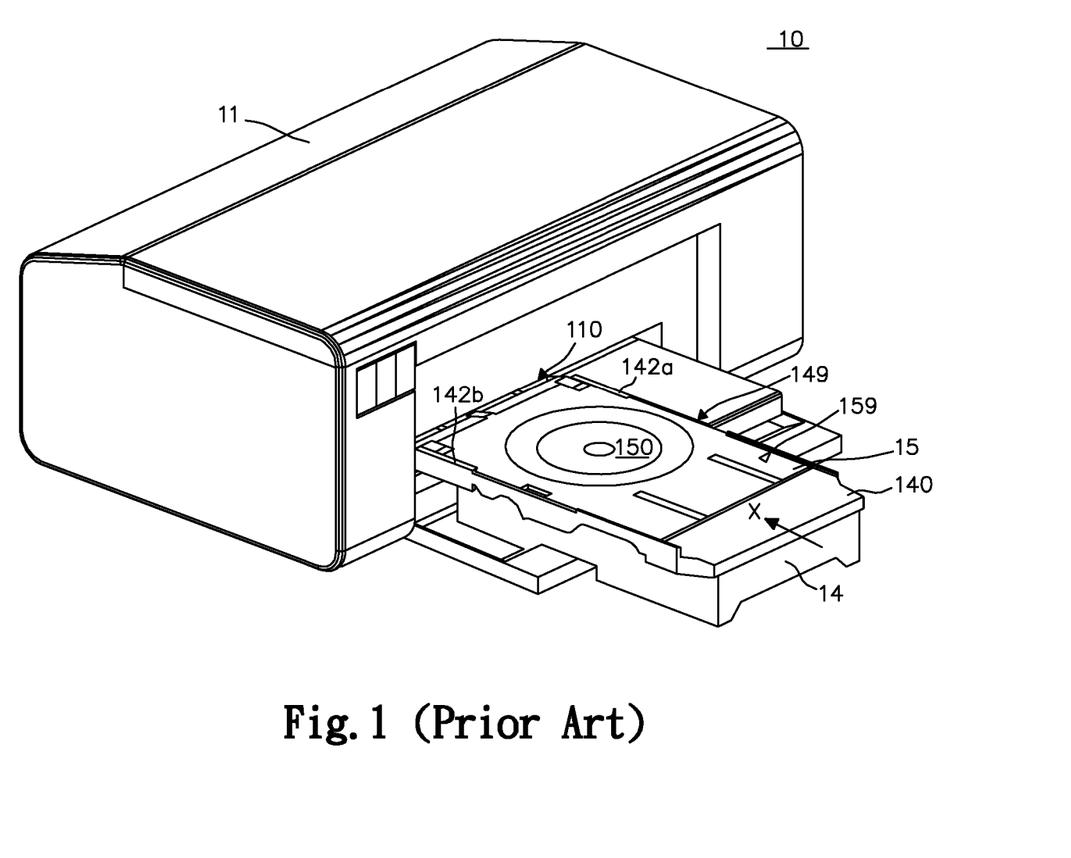
FIG. 1 is a stereo view of a conventional printer.

Referring to FIG. 1, which illustrates a stereo view of a conventional printer, as shown in FIG. 1, a printer 10 executes a disk printing mode and includes a main body 11 and a slot 110, wherein the slot 110 has a long and narrow shape and is as a entrance of the print materials; a feeding mechanism is disposed in the main body 30 and used to guide the print materials through a roller conveying structure. As shown in FIG. 1, the print 10 further includes a base 14 and a slaver 15, wherein the based 14 is assembled with the main body 11 via the slot 110 and has a plane portion 140, two grip plates are respectively disposed on two opposite sides of the plane portion 140 so as to formed a guiding track with the plane portion 140, further that, the slaver 15 is disposed and capable of sliding on the plane portion 140 by way of the guiding track.

The slaver 15 has an accommodation district 150, the size of the accommodation district 150 is suitable for accommodating the disk. The disk must be faced up and placed onto accommodation district 150, and then the slaver 15 can be drove to slide toward the entrance of the slot 110 and arrive at a proper point. General speaking, two marks 149, 159 are respectively labeled on the base 14 and the slaver 15; A user needs to push the slaver 15 and align the mark 159 with the mark 149 for connecting the slaver 15 and the feeding mechanism in the main body 11, further that, the feeding mechanism receives and transports the slaver 15 into main body 11, and then the disk is printed by a printing module. The feeding mechanism withdraws the slaver 15 after printing the disk, and then the user can retrieve the printed disk.

In general, the print time of single disk is around certain minutes, so that, the man-operation mode will cause the disadvantages of high cost and error operation when mass producing the disks. For this reason, substituting the automation-operation for the man-operation is the subject in industry. So that, the impotent technology is how to design the roller conveying structure for coordinating with the operation of the feeding mechanism in the printer.

Accordingly, in view of the shortcomings of the conventional printer, the inventor of the present invention has made great efforts to make improvement thereon and finally provides a disk guiding device capable of applying in a disk process device.

BRIEF SUMMARY OF THE INVENTION

The primary objective of the present invention is to provide a disk guiding device capable of being applied in a disk process device, the disk guiding device has a transmitting portion and a positioning module, by way of the transmitting portion and the positioning module, the route of a slaver is able to be confined, and the slaver can be held and released so as to co-operate with a feeding mechanism of the disk process device, and then an automatic disk process environment is established.

To accomplish the primary objective described above, a disk guiding device is proposed and disposed on a disk process device has a main body with a slot portion.

The disk guiding device described above comprises: a base, a transmitting portion and a slaver. The base is disposed on a main body and has a plane portion and a side wall perpendicular to the plane portion. A guiding track is disposed on the plane portion and extends toward a slot portion of the main body. The transmitting portion comprises a gear and a positioning module, the gear is connected to the side wall of the base and has a long gear and a plurality of short gears, wherein the height of the long gear is greater than the height of the short gears. The positioning module is disposed on the base used to sustain and take the crown of the long gear protruding out of the short gears for confining the rotation angle of the gear. The slaver is disposed and capable of sliding on the plane portion through the guiding track; moreover, the slaver comprises an edge-side and a plurality of holes, the plurality of holes are disposed on the salver in sequence from the end-side toward the perpendicular direction thereof, the holes are used to correspondingly engage with the gear so as to drive the slaver to slide when the gear rotates. The holes escape from the gear when the gear drives the slaver sliding toward the entrance of the slot portion and arriving at a limitation point.

Preferably, one of the short gears is against the end-side of the slaver after the gear impelling the slaver to slide toward the slot portion and arrive at the limitation point.

Further that, the disk guiding device applied in the disk process device according to the present invention is able to confine the route of the slaver by way of the transmitting portion and the positioning module, furthermore, the transmitting portion and the positioning module is capable of releasing/holding the slaver corresponding to fed-in/fed-out motion of a feeding mechanism within the disk process device.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To explain the disk guiding device of the present invention more clearly, detailed description will be made hereinbelow with reference to the attached drawings.

Figure 2:
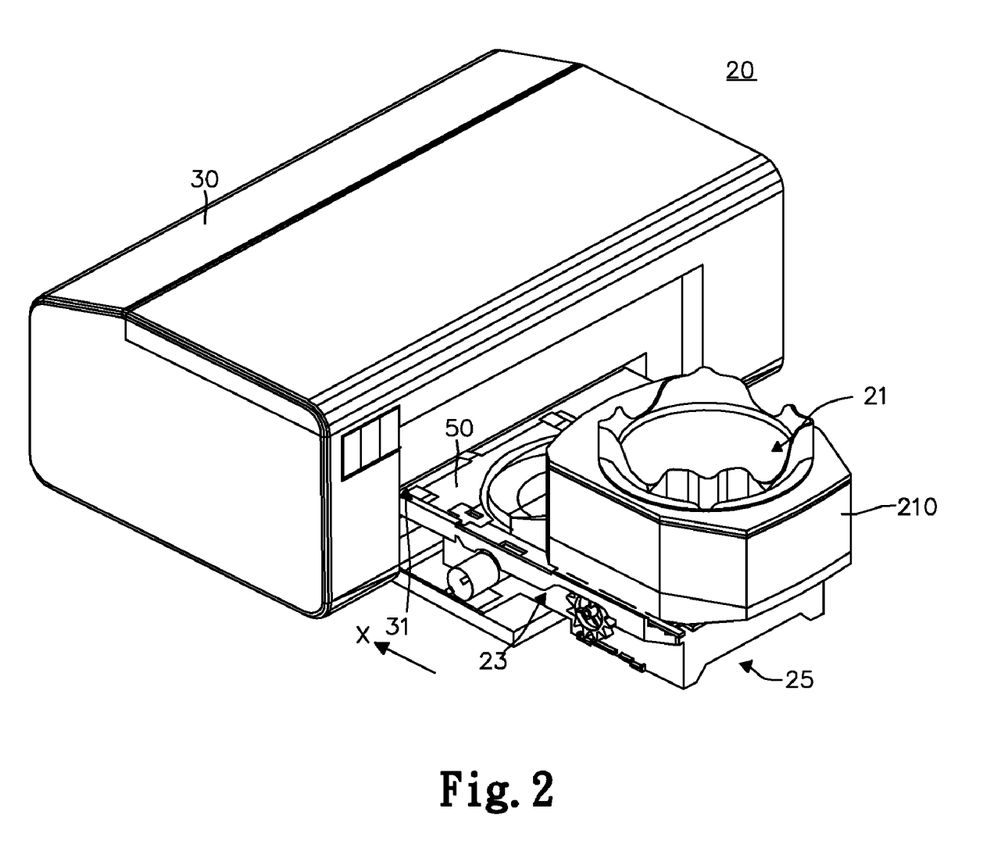
FIG. 2 is the stereo view of an embodiment of a disk guiding device according to the present invention.

Referring to FIG. 2, which illustrates a stereo view of an embodiment of the disk guiding device according to the present invention, wherein a disk process device 20 is a printer capable of printing a disk cover.

As shown in FIG. 2, the disk process device 20 includes: a main body 30, a disk serving mechanism 21, the disk guiding device 25, and a collecting mechanism disposed on a bottom space 23. A slot portion 31 with long and narrow shape is disposed on the main body 30 and is adapted to receive an inputted external object. A feeding mechanism is disposed on the internal of the main body 30 and is used to guide the object through a roller conveying structure. As shown in FIG. 2, a direction X is defined and represents the entrance direction of the slot portion 31. In general, the disk process device 20 is connected to a computer for controlling the print process, wherein the feeding mechanism, a printing module disposed in the main body 30, the disk serving mechanism 21, the disk guiding mechanism 25, and the collecting mechanism disposed on the bottom space 23 can be co-operated to automatically accomplish the print process of a disk according to the set process procedures.

The disk serving mechanism 21 has a disk bucket 210 used to stack the plurality of disks which have not been processed; the disk guiding device 25 includes a slaver 50 adapted to carry the disks into the main body 30 for printing. The disk serving mechanism 21 moves one of the disks onto the slaver 50, and then the disk guiding device transports the slaver 50 with the disk along the direction X and toward the slot portion 31 to a predetermined point; thereafter, the feeding mechanism of the main body 30 receives and inputs the slaver 50 into the main body 30; After finishing the print process, the slaver 50 is withdrew by the feeding mechanism and is re-received by the disk guiding mechanism 25, thereafter, the disk guiding mechanism 25 conveys the slaver 50 reversely toward the direction X to an original point of the slaver 50, and then the processed disk is inputted into the collecting mechanism automatically.

Figure 3:
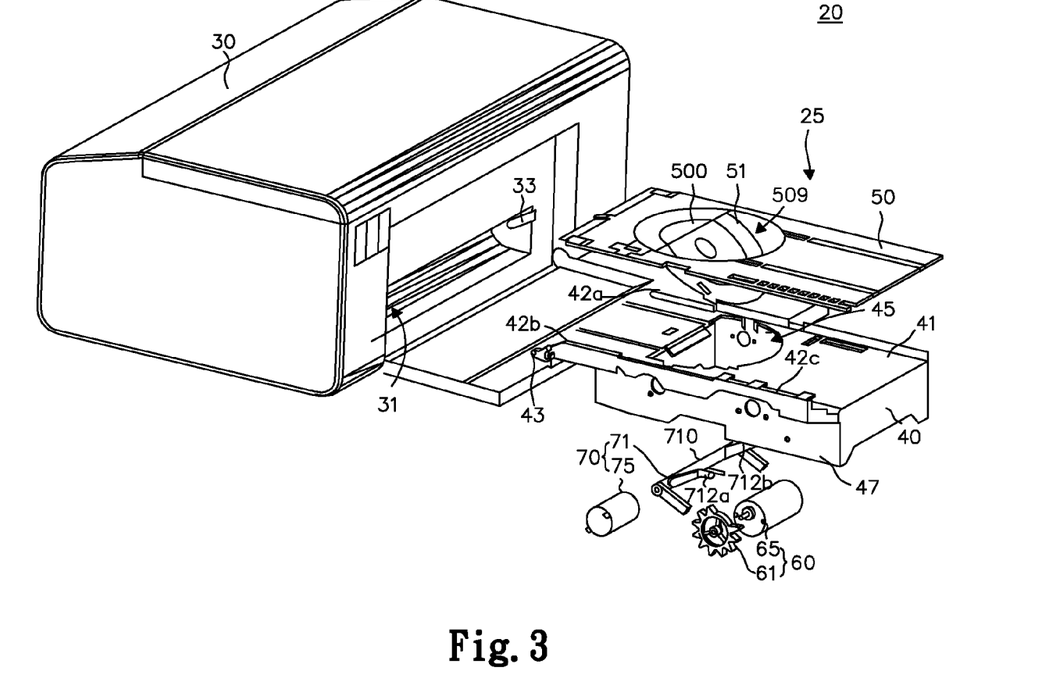
FIG. 3 is an exploded view of the disk guiding device according to the present invention.

Referring to FIG. 3, which illustrates an exploded view of the disk guiding device according to the present invention, the disk guiding mechanism includes a base 40, a slaver 50, a transmitting portion 60, and a releasing member 70.

The base 40 described above includes a combining portion 43, a plane portion 41 and a side wall 47. The main body 30 has an assembling portion 33, wherein the combining portion 43 of the base 40 is combined with the assembling portion 33 via the slot portion 31, so that the base 40 is disposed on the main body 30. The side wall 47 is perpendicular to the plane portion 41; Moreover, three grip plates (42a, 42b and 42c) are respectively disposed on the two opposite sides of the plane portion 41, a gap forming between the grip plates (42a, 42b and 42c) and the plane portion 41 is took as a guiding track, in the preferable embodiment of the present invention, the guiding track extends toward the direction X and the entrance of the slot portion 31. The base 40 further includes an aperture 45, wherein the aperture 45 is disposed on the base 40 and has a specific shape size capable of facilitating the disk pass through downwardly The slaver 50 is disposed and capable of sliding on the plane portion 41 of the base 40 through the guiding track so as to be drove to sliding into and sliding out from the slot portion 31. The slaver 50 has an accommodation district 500 adapted to accommodate the disk. The slaver 50 further includes a opening 509 which can also facilitate the disk to pass through downwardly, the movable plate 51 is pivotally connected to the opening 509, the shape size of the movable plate 51 almost matches to the opening 509, so that, after the opening 509 of the slaver 50 being stacked onto the aperture 45 of the base 40, the disk is able to fall downwardly from the accommodation district 500 when the movable plate 51 is opened; Besides, the opening 509 is closed when an auxiliary member is used to support the below side of the movable plate 51.

The releasing member 70 includes a bracket 71 and a motor 75 used to drive the bracket 71, moreover, the bracket 71 includes a shaft 710 and two supporting arms 712a, 712b connected to the shaft 710, wherein the shaft 710 is pivotally disposed on the side wall 47 of the base 40 and is connected to the motor 75, so that the bracket 71 can be drove to be as a supporting state and a releasing state by the motor 75. When the bracket 71 is in the supporting state, the supporting arms 712a, 712b extend toward the aperture 45 and hold up the movable plate 51 to close the opening 509; Moreover, when the bracket 71 is in the releasing state, the supporting arms 712a, 712b rotate with the shaft 710 to a certain point so as to stop to hold up the movable plate 51, and then the disk slides out of the accommodation district 500 and gets into the collecting mechanism.

Figure 4:
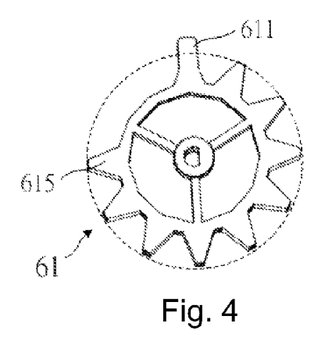
FIG. 4 is the stereo view of a gear of the disk guiding device according to the present invention.
Figure 5A:
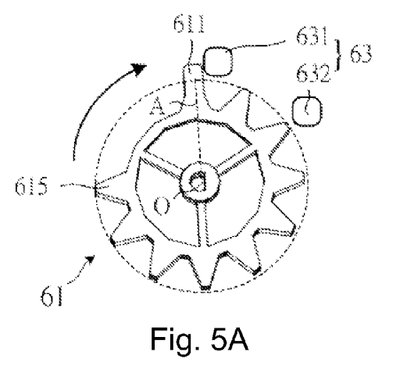
FIGS. 5A and 5B are views illustrating subdivided actions of the gear of the disk guiding device according to the present invention.
Figure 5B:
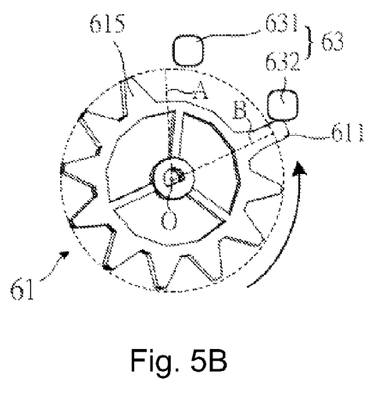

The transmitting portion 60 includes a gear 61, a motor 65 and a positioning module 63 (not shown in figure). The gear 61 and the motor 65 are pivotally disposed on the side wall 47 of the base 40; the positioning module 63 is disposed on the base 40 closing to the gear 61 and is adapted to confine the route of the slaver 50. The design of the gear 65 and the positioning module 63 are the technique features of the present invention. Referring to FIGS. 4, 5A and 5B together, wherein FIG. 4 illustrates the stereo view of the gear of the disk guiding device according to the present invention, FIGS. 5A and 5B are views illustrating subdivided actions of the gear of the disk guiding device according to the present invention. The design conception of the gear 61 will be described below.

The gear 61 includes a long gear 611 and a plurality of short gears 615, the height of the long gear 611 is greater than the height of the short gears 615, so that the crown of the long gear 611 protrudes out of the short gears 615. The positioning module 63 is disposed on the base 40 closing to the gear 61 so as to sustain and take the crown of the long gear 611 for confining the rotation angle of the gear 61. In preferable embodiment of the present invention, the positioning module 63 includes two block chunk 631, 632, which are disposed on the outer ring of a circle made of the gear height of the short gears 615 for sustaining and taking the crown of the long gear 611.

Further that, when the gear 611 rotates clockwise by taking a pivotal point as an axis center, meanwhile, the crown collides the block chunk 631 when the long gear 611 rotates to a point A, so that the rotation of the gear 611 is stopped; moreover, when the gear 611 rotates counterclockwise by taking the pivotal point as the axis center, meanwhile, the crown runs into the block chunk 632 when the long gear 611 rotates to a point B, further that the rotation of the gear 611 is ceased, and then the rotation angle of the gear 611 is able to be confined.

Figure 6:
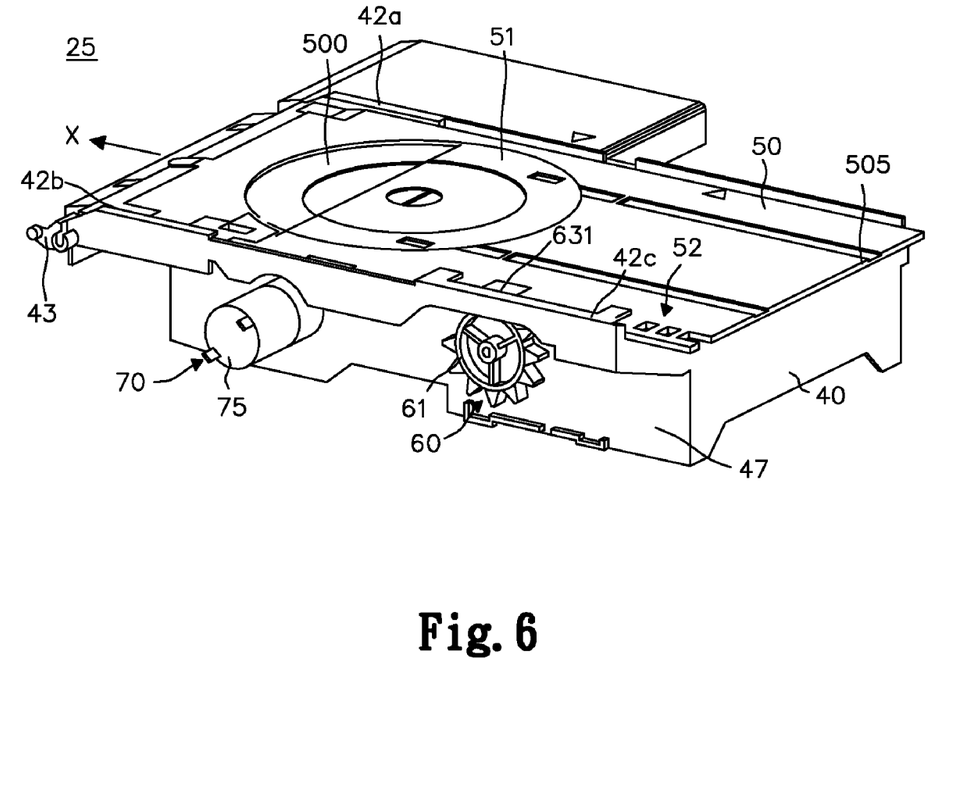
FIG. 6 is the stereo view illustrating a slaver of the disk guiding device being driven to a limitation point.
Figure 7:
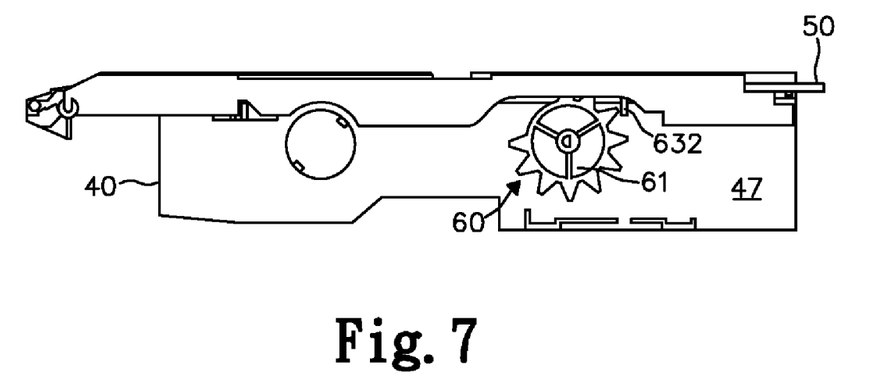
FIG. 7 is a side view illustrating the slaver of the disk guiding device being driven to the limitation point.
Figure 8:
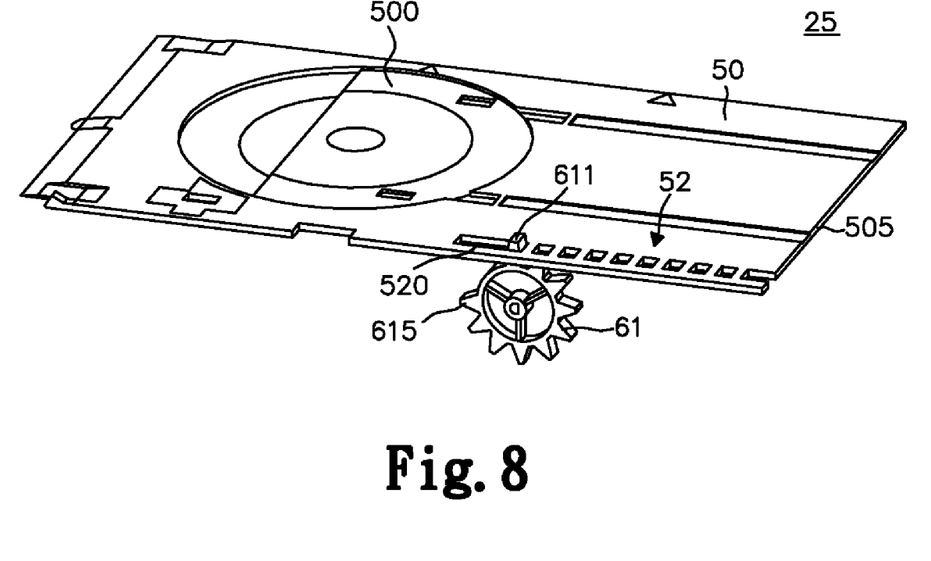
FIG. 8 is a second stereo view illustrating the slaver of the disk guiding device being driven to the limitation point.

Continuously referring to FIGS. 6, 7 and 8 together, which are respectively the stereo view, a side view and a second stereo view illustrating the slaver of the disk guiding device being drove to the limitation point. The moving route of the slaver 50 must be confined within a certain range, and the two ends of the certain range are respectively defined as an external limitation point and an internal limitation point.

The external limitation point described above indicates a default point of the slaver 50 staying out of the main body 30. The accommodation district 500 is adapted to be co-operated with the disk serving mechanism 21 and the collecting mechanism. The internal limitation point represents a connection point of the slaver 50 and the feeding mechanism in the main body 30, wherein when the slaver 50 is positioned at the internal limitation point, the feeding mechanism is able to connect the slaver 50, and then the feeding mechanism can further facilitate the slaver 50 get into the main body 30 for processing the disk. When the slaver 50 is stayed at the internal limitation point, the disk guiding device 25 must operates according to the movement of the feeding mechanism to pre-release the slaver 50, and then the feeding mechanism can receive the slaver 50.

As shown as FIGS. 6, 7 and 8, the slaver 50 is assembled with the base 40 through the guiding track formed by the grip plates (42a, 42b and 42c) and jointed onto the plane portion 41. The slaver 50 includes an end-side 505 and a hole series 52 with a plurality of holes, wherein the plurality of holes are disposed on the salver 50 in sequence from the end-side 505 toward the perpendicular direction thereof, the direction is the same as the sliding direction when the slaver 50 slides along the guiding tack. Hole series 52 is correspondingly engaged with the gear 61 so as to drive the slaver 50 to slide when the gear 61 rotates. Moreover, a slit 412 (shown in FIG. 9) is disposed on the base 40, the disposed position of the slit 412 is coordinate to the engagement position of the hole series 52 and the gear 61, further that, the transmitting portion 52 is capable of correspondingly engaging with the gear 61.

The hole series 52 has a first hole 520 with larger hole size and is adapted to engage with the long gear 611 of the gear 61. When the gear 61 rotates clockwise, meanwhile, the gear 61 is stopped rotating when the crown of the long gear 611 collides the block chunk 631. In the preferable embodiment of the present invention, the block chunk 631 is disposed upon the base 40 and has a grip plate shape. When the gear 61 rotates counterclockwise, meanwhile, the holes of the hole series 52 are engaged with the gear 61 one after another so as to drive the slaver 50 sliding toward the direction X.

Figure 9:
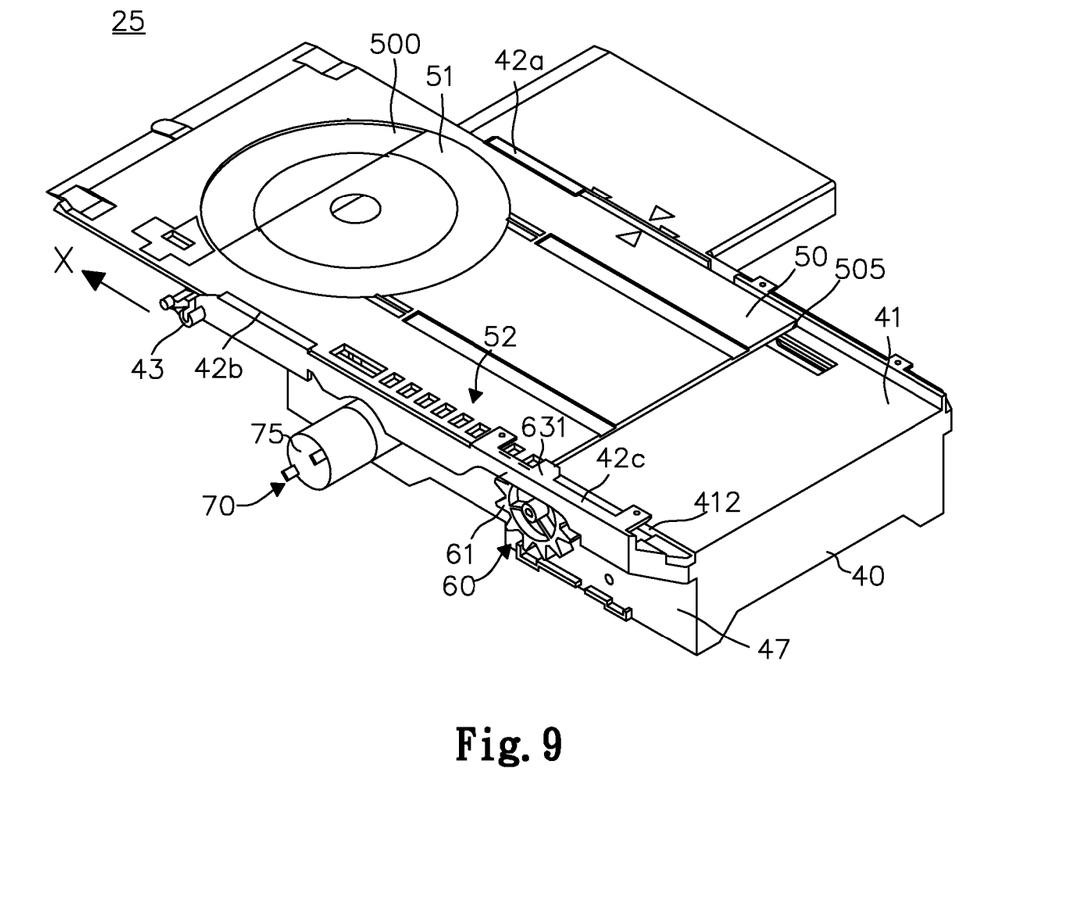
FIG. 9 is the stereo view illustrating the slaver of the disk guiding device being driven to an internal limitation point.
Figure 10:
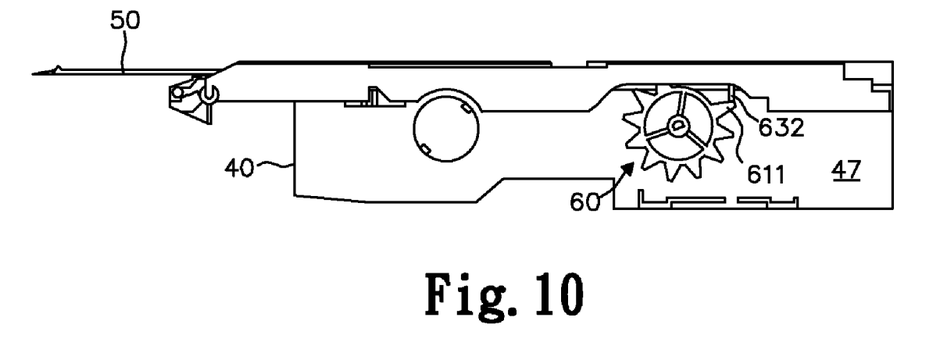
FIG. 10 is the side view illustrating the slaver of the disk guiding device being driven to the internal limitation point.
Figure 11:
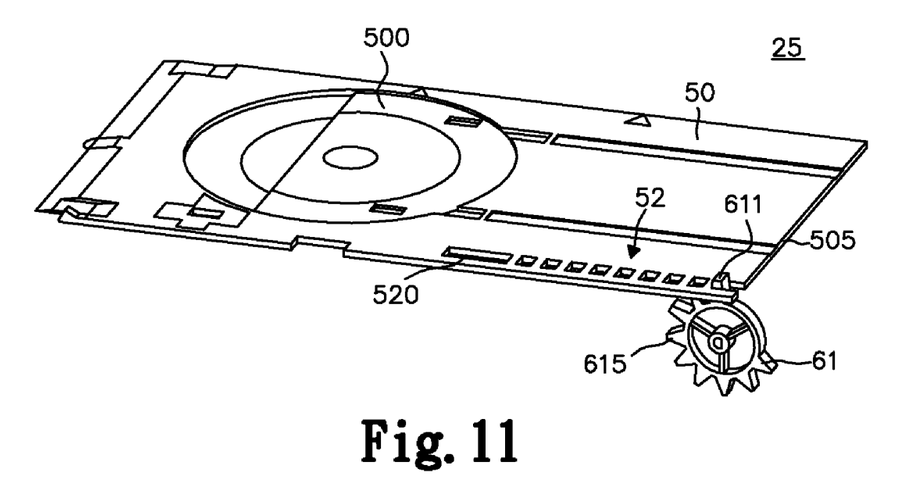
FIG. 11 is the second stereo view illustrating the slaver of the disk guiding device being drove to the internal limitation point.

Referring to FIGS. 9, 10 and 11, which are the stereo view, the side view, and the second stereo view illustrating the slaver of the disk guiding device being drove to the internal limitation point.

When the slaver 50 is drove to the internal limitation point, furthermore, the slaver 50 escapes from the gear 61 and is sent into the main body 30, and then is received by the feeding mechanism. As shown in FIGS. 9, 10 and 11, when the gear 61 rotates counterclockwise, meanwhile, the crown of the long gear 611 collides the block chunk 632 so as to cease the rotation of the gear 61, further that, one of the holes 615 takes the end-side of the slaver 50 and protrudes out of the plane portion 41, meanwhile, the hole series 52 completely escape from engaging with the gear 61, and then the slaver 50 is drove to slides toward the main body 30.

Figure 12:
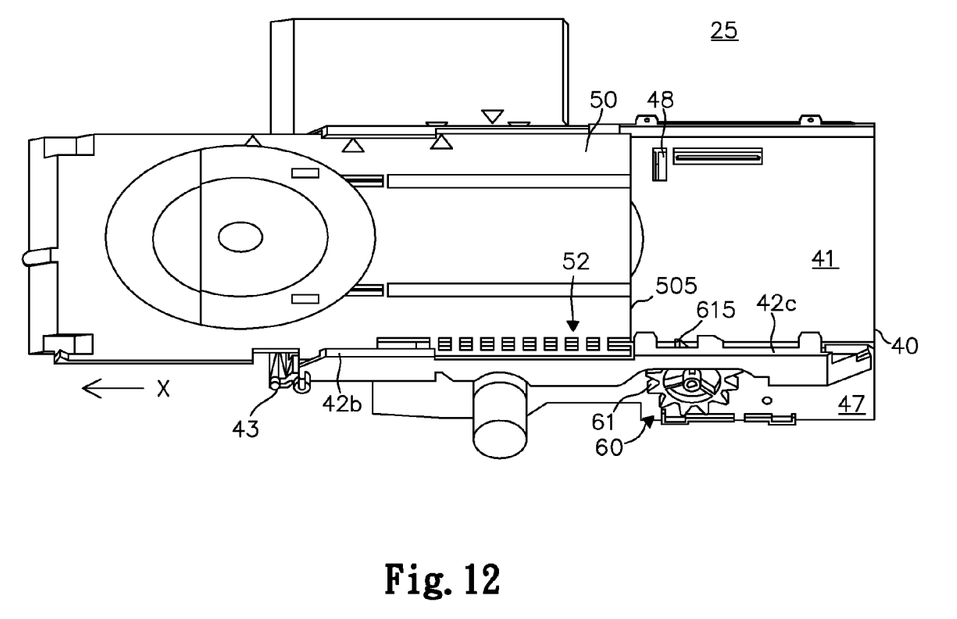
FIG. 12 is the stereo view illustrating the slaver of the disk guiding device being driven into a main body.

Referring to FIG. 12, which is the stereo view illustrating the slaver of the disk guiding device being drove into the main body. When the feeding mechanism disposed in the main body 30 sends the slaver 50 into the main body 30 to execute the print process of the disk. When the feeding mechanism withdraws the slaver 50 after the disk being processed, meanwhile, the slaver 50 still possess a velocity to slide reversely toward the direction X when the slaver 50 arrives at the internal limitation point, further that, the slaver 50 can be stop to slide by using the short gear 615 protruding out of the plane portion 41 to take the end-side 505 of the slaver 50.

When the slaver 50 is sent back to the internal limitation point, the motor 65 starts to drive the gear 61 to rotate clockwise, so that the hole series 52 is engaged with the gear 61 again, and then the slaver 50 slides toward the external limitation point with the rotation of the gear 61. Incidentally speaking, a sensing device can be disposed on a proper location of the base 40 for detecting the movement of the slaver 50, preferably, a optical reflection device is disposed on a hollowed space 48, moreover, a reflection member is correspondingly disposed on the bottom surface of the slaver 50, so that, the motor 75 is able to be controlled by using the optical reflection device to detect whether the slaver 50 slides back to the internal limitation point.

Finally, to conclude the above-mentioned mechanism functions of the disk guiding device according to the present invention by a disk process procedure. Firstly, the slaver 50 is positioned at the external limitation point, meanwhile, the bracket 71 is lay as the supporting state.

Thereafter, the serving mechanism 21 controls the disk to fall into the accommodation district 500 and controls the motor 65 to drive the gear 61 rotating counterclockwise so as to facilitate the slaver 50 slide along the direction X, that is, sliding toward the entrance of the slot portion 31; After the long gear 611 of the gear 61 colliding the block chunk 632, the slaver 50 arrives at the internal limitation point, meanwhile, one of the short gears 615 takes the end-side 505 of the slaver 50, and the hole series 52 escapes from engaging with gear 61, so that, the feeding mechanism sends the slaver 50 into the main body 30 for processing the disk.

After processing the disk, the feeding mechanism withdraws the slaver 50, and then the slaver 50 is stopped to move when the end-side 505 runs into the short gear 615 protruding out of the plane portion 41; After the slaver 50 is sent back to the internal limitation point, a center controller of the disk process device 20 controls the motor 65 rotating clockwise again, and then the slaver 50 is drove to slide toward the direction X and is conveyed back to the external limitation point. Further that, the gear 61 rotating clockwise is stopped to rotate due to the long gear 611 collides the block chunk 631, and then the slaver 50 is positioned at the external limitation point again. On the other hand, after the slaver 50 is conveyed from the external limitation point to the internal limitation point, the center controller controls the motor 75 running, and the bracket 71 is lay as the releasing state. Further that, when the slaver 50 slides reversely toward the direction X, meanwhile, the movable plate 51 is opened through the aperture 45 of the base 40 so as to facilitate the disk to fall downwardly.

Thus, the disk guiding device of the present invention has been described clearly. In summary, the present invention provides with the gear of the transmitting portion and the positioning module so as to confine the route of the slaver, furthermore, to release and hole the slaver according to the fed-in and fed-out movements of the feeding mechanism in the disk process device, so that an automatic disk process device has made of the disk process device and the disk guiding device.

The above description is made on an embodiment of the present invention. However, this embodiment is not intended to limit scope of the present invention, and all equivalent implementations or alterations within the spirit of the present invention still fall within the scope of the present invention.

What is claimed is:

1. A disk guiding device, being correspondingly disposed on a disk process device having a main body with a slot portion, the disk guiding device comprising:
    a base, being disposed on the main body and having a side wall and a plane portion with a guiding track, wherein the side wall is perpendicular to the plane portion, and the guiding track being extended toward the slot portion;
    a transmitting portion, having a gear and a positioning module, the gear being pivotally connected to the side wall and having a long gear and a plurality of short gears, wherein the height of the long gear is greater than the height of the short gears, the positioning module being disposed on the base and used to sustain and take the crown of the long gear protruding out of the short gears for confining the rotation angle of the gear; and
    a salver, being disposed and capable of sliding on the plane portion, and having an end-side and a plurality of holes, wherein the plurality of holes are disposed on the salver in sequence from the end-side toward the perpendicular direction thereof, the holes being adapted to correspondingly engage with the gear, so that the salver is able to be drove to slide when the gear rotates;
    wherein the holes escape from engaging with the gear when the slaver slides toward the entrance of the slot portion and further slides to a limitation point drove by the gear.

2. The disk guiding device of claim 1, wherein one of the short gears is urged the end-side when the slaver slides toward the entrance of the slot portion and further slides to the limitation point driven by the gear.

3. The disk guiding device of claim 1, wherein the positioning module comprises two block chunks, which respectively urge the crown of the long gear when the gear rotates clockwise and counterclockwise.

4. The disk guiding device of claim 1, wherein a slit is disposed on the base where is corresponding to the engagement position of the gear and the holes on the slaver.

5. The disk guiding device of claim 1, wherein one of the holes is correspondingly engaged with the long gear, and the size of the hole engaged with the long gear is greater than the other holes.

6. The disk guiding device of claim 1, wherein the transmitting portion further comprises a motor used to drive the gear.

7. The disk guiding device of claim 1, wherein the slaver further comprises an accommodation district for accommodating the disk.

8. The disk guiding device of claim 7, wherein the accommodation district has a opening capable of facilitating the disk to go through downwardly, moreover, the slaver further comprises a movable plate pivotally connected to the opening.

9. The disk guiding device of claim 8, wherein after the opening of the slaver being stacked onto the aperture on the base, the movable plate being opened through the aperture of the base.

10. The disk guiding device of claim 9, further comprising a releasing member having a bracket pivotally disposed on the side wall where is corresponding to the aperture of the base, the bracket being able to be selectively positioned as one of a supporting state and a releasing state, wherein when the bracket is in the supporting state, the bracket is able to support the movable plate, and when the bracket is in the releasing state, the bracket ceases to support the movable plate.

11. The disk guiding device of claim 10, wherein the bracket comprises a shaft and at least one supporting arm, the shaft being pivotally disposed on the side wall of the base, the supporting arm being connected to the shaft, when the bracket is in the supporting state, the supporting arm extends toward the aperture of the base and holds up the movable plate to close the opening of the slaver.

12. The disk guiding device of claim 11, wherein when the bracket is in the releasing state, the shaft rotates a certain angle, so that the supporting arm stops to hold up the movable plate.

13. The disk guiding device of claim 12, wherein the releasing member further comprises a motor used to control the rotation of the shaft so as to control the position of the supporting arm, so that the bracket is controlled to be in one of the supporting state and the releasing state.

* * * * *